United States Patent
Nakano et al.

(10) Patent No.: US 8,515,764 B2
(45) Date of Patent: Aug. 20, 2013

(54) QUESTION AND ANSWER DATABASE EXPANSION BASED ON SPEECH RECOGNITION USING A SPECIALIZED AND A GENERAL LANGUAGE MODEL

(75) Inventors: Mikio Nakano, Wako (JP); Kotaro Funakoshi, Wako (JP); Hiromi Narimatsu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 642 days.

(21) Appl. No.: 12/832,426

(22) Filed: Jul. 8, 2010

(65) Prior Publication Data

US 2011/0010177 A1 Jan. 13, 2011

Related U.S. Application Data

(60) Provisional application No. 61/223,817, filed on Jul. 8, 2009.

(51) Int. Cl.
*G10L 15/22* (2006.01)
*G10L 15/08* (2006.01)

(52) U.S. Cl.
USPC .......................................... 704/275; 704/251

(58) Field of Classification Search
None
See application file for complete search history.

(56) References Cited

U.S. PATENT DOCUMENTS

| | | | |
|---|---|---|---|
| 7,139,706 B2* | 11/2006 | Yuschik | 704/243 |
| 7,337,116 B2* | 2/2008 | Charlesworth et al. | 704/254 |
| 7,392,185 B2* | 6/2008 | Bennett | 704/243 |
| 7,555,431 B2* | 6/2009 | Bennett | 704/255 |
| 7,584,103 B2* | 9/2009 | Fritsch et al. | 704/257 |
| 7,624,007 B2* | 11/2009 | Bennett | 704/9 |
| 7,640,164 B2* | 12/2009 | Sasaki et al. | 704/272 |
| 7,657,424 B2* | 2/2010 | Bennett | 704/9 |
| 7,698,131 B2* | 4/2010 | Bennett | 704/215 |
| 7,702,508 B2* | 4/2010 | Bennett | 704/257 |
| 7,725,320 B2* | 5/2010 | Bennett | 704/255 |
| 8,301,448 B2* | 10/2012 | Carus et al. | 704/257 |
| 2003/0191639 A1* | 10/2003 | Mazza | 704/231 |
| 2003/0220796 A1* | 11/2003 | Aoyama et al. | 704/275 |

FOREIGN PATENT DOCUMENTS

JP     2004-118740     4/2004

* cited by examiner

*Primary Examiner* — Talivaldis Ivars Smits
(74) *Attorney, Agent, or Firm* — Nelson Mullins Riley & Scarborough LLP; Anthony A. Laurentano

(57) ABSTRACT

A question and answer database expansion apparatus includes: a question and answer database in which questions and answers corresponding to the questions are registered in association with each other, a first speech recognition unit which carries out speech recognition for an input sound signal by using a language model based on the question and answer database, and outputs a first speech recognition result as the recognition result, a second speech recognition unit which carries out speech recognition for the input sound signal by using a language model based on a large vocabulary database, and outputs a second speech recognition result as the recognition result, and a question detection unit which detects an unregistered utterance, which is not registered in the question and answer database, from the input sound based on the first speech recognition result and the second speech recognition result, and outputs the detected unregistered utterance.

5 Claims, 12 Drawing Sheets

FIG. 2

```
<qa id="sengawa-park">
 <question>
  <sentence>LET ME KNOW A {PARK} IN {SENGAWA}</sentence>(QUESTION SENTENCE EXAMPLE)
  <sentence>IS THERE A {PLAZA} IN {SENGAWA}?</sentence>
 </question>
 <answer topic="sengawa-park">
  <madl>
   <show-slide uri="file://${SENGAWA_PPT_DIR}/wh.ppt#17" />(SLIDE DISPLAY)
   <utterance>THERE IS THE MEMORIAL PARK OF SANEATSU MUSHANOKOJI IN SENGAWA.
   </utterance>(ANSWER)
  </madl>
 </answer>
</qa>
```

FIG. 3

| | | CLASSIFICATION RESULT OF SPEECH RECOGNITION RESULT | | | | | TOTAL |
|---|---|---|---|---|---|---|---|
| | | ASR+IniDB IS WITHIN DB | | | | ASR+IniDB IS OUT OF DB (A5) | |
| | | ASR+IniDB =Trans+IniDB =Trans+ExpDB (A1) | ASR+IniDB =Trans+IniDB (≠Trans+ExpDB) (A2) | ASR+IniDB =Trans+ExpDB (≠Trans+IniDB) (A3) | OTHERS (ERRONEOUS RECOGNITION) (A4) | | |
| TRANSCRIBED UTTERANCE CLASSIFICATION RESULT | Trans+IniDB =Trans+ExpDB (T1) | (1) 246 ~111 | | | (2) 15 ~114 | (3) 31 ~115 | 292 |
| | Trans+IniDB (≠Trans+ExpDB) IS WITHIN DB (T2) | | (4) 44 ~122 | (5) 2 ~123 | (6) 26 ~124 | (7) 4 ~125 | 76 |
| | Trans+IniDB IS OUT OF DB (T3) | | | (8) 6 ~133 | (9) 38 ~134 | (10) 91 ~135 | 135 |
| | NOISE AND THE LIKE (T4) | | | (11) 2 ~143 | (11) 12 ~144 | (12) 108 ~145 | 122 |
| TOTAL | | 246 | 44 | 10 | 91 | 234 | 625 |

FIG. 4A

| SYMBOL | MEANING |
|---|---|
| $F_{db}1$ | WHETHER OR NOT SYSTEM DETERMINES TO BE OUT OF DB (PRESENCE OR ABSENCE OF SELECTED ANSWER) |
| $F_{db}2$ | ACOUSTIC SCORE OF FIRST CANDIDATE OF RECOGNITION RESULT/(divided by) UTTERANCE LENGTH |
| $F_{db}3$ | LANGUAGE SCORE OF FIRST CANDIDATE OF RECOGNITION RESULT |
| $F_{db}4$ | $\sum_{k=1}^{n}$ (NUMBER OF APPEARANCES OF KEY PHRASE i USED FOR ANSWER SELECTION IN n-TH CANDIDATE OF RECOGNITION RESULT/ NUMBER OF WORDS OF n-TH CANDIDATE)/NUMBER OF CANDIDATES OF RECOGNITION RESULT |
| $F_{db}5$ | $\min_i$ (NUMBER OF APPEARANCES OF KEY PHRASE i USED FOR ANSWER SELECTION IN ALL RECOGNITION RESULTS) |
| $F_{db}6$ | $\max_i$ (NUMBER OF APPEARANCES OF KEY PHRASE i USED FOR ANSWER SELECTION IN ALL RECOGNITION RESULTS) |
| $F_{db}7$ | NUMBER OF KEY PHRASES WITHIN DB INCLUDED IN FIRST CANDIDATE OF RECOGNITION RESULT -(minus) NUMBER OF KEY PHRASES USED FOR ANSWER SELECTION |
| $F_{db}8$ | $\min_i$ (NUMBER OF APPEARANCES OF KEY PHRASE i USED FOR ANSWER SELECTION IN n-TH CANDIDATE OF RECOGNITION RESULT/NUMBER OF WORDS OF n-TH CANDIDATE) |
| $F_{db}9$ | $\max_i$ (NUMBER OF APPEARANCES OF KEY PHRASE i USED FOR ANSWER SELECTION IN n-TH CANDIDATE OF RECOGNITION RESULT/NUMBER OF WORDS OF n-TH CANDIDATE) |
| $F_{db}10$ | WHETHER OR NOT RECOGNITION RESULT IS INCLUDED IN SUPPORTIVE RESPONSE LIST |
| $F_{db}11$ | NUMBER OF WORDS OF FIRST CANDIDATE OF RECOGNITION RESULT |
| $F_{db}12$ | NUMBER OF WORDS OF ALL RECOGNITION RESULTS |
| $F_{db}13$ | AVG (JULIUS) CONFIDENCE OF FIRST CANDIDATE OF KEY PHRASE USED FOR ANSWER SELECTION |
| $F_{db}14$ | $\max_i$ (JULIUS CONFIDENCE OF FIRST CANDIDATE OF KEY PHRASE i USED FOR ANSWER SELECTION) |
| $F_{db}15$ | $\min_n$ (JULIUS CONFIDENCE OF FIRST CANDIDATE OF KEY PHRASE USED FOR ANSWER SELECTION) |
| $F_{db}16$ | NUMBER OF CANDIDATES OF RECOGNITION RESULT |
| $F_{db}17$ | NUMBER OF NOUNS INCLUDED IN FIRST CANDIDATE OF RECOGNITION RESULT/ NUMBER OF WORDS OF FIRST CANDIDATE OF RECOGNITION RESULT |
| $F_{db}18$ | NUMBER OF NOUNS INCLUDED IN ALL CANDIDATES OF RECOGNITION RESULT/ NUMBER OF WORDS OF ALL CANDIDATES OF RECOGNITION RESULT |

FIG. 4B

| SYMBOL | MEANING |
|---|---|
| $F_{lv}1$ | WHETHER OR NOT SYSTEM DETERMINES TO BE OUT OF DB (PRESENCE/ABSENCE OF SELECTED ANSWER) |
| $F_{lv}2$ | ACOUSTIC SCORE OF FIRST CANDIDATE OF RECOGNITION RESULT/UTTERANCE LENGTH |
| $F_{lv}3$ | LANGUAGE SCORE OF FIRST CANDIDATE OF RECOGNITION RESULT |
| $F_{lv}4$ | WHETHER OR NOT RECOGNITION RESULT IS INCLUDED IN SUPPORTIVE RESPONSE LIST |
| $F_{lv}5$ | NUMBER OF VOCABULARIES OF FIRST CANDIDATE OF RECOGNITION RESULT |
| $F_{lv}6$ | NUMBER OF VOCABULARIES OF ALL RECOGNITION RESULTS |
| $F_{lv}7$ | NUMBER OF CANDIDATES OF RECOGNITION RESULT |
| $F_{lv}8$ | NUMBER OF NOUNS WHICH APPEAR IN FIRST CANDIDATE OF RECOGNITION RESULT/ NUMBER OF WORDS OF FIRST CANDIDATE OF RECOGNITION RESULT |
| $F_{lv}9$ | NUMBER OF NOUNS WHICH APPEAR IN ALL CANDIDATES OF RECOGNITION RESULT/ NUMBER OF WORDS OF ALL CANDIDATES OF RECOGNITION RESULT |
| $F_{dblv}1$ | DIFFERENCE IN ACOUSTIC SCORE |
| $F_{dblv}2$ | DIFFERENCE IN LANGUAGE SCORE |

FIG. 5

| FEATURE QUANTITY | INFORMATION TO BE OBTAINED |
|---|---|
| APPEARANCE FREQUENCY OF KEY PHRASE | CORRECTNESS OF RECOGNITION OF KEY PHRASE |
| PRESENCE/ABSENCE OF NOUN OTHER THAN KEY PHRASE USED FOR ANSWER SELECTION | POSSIBILITY OF ERRONEOUS ANSWER SELECTION |
| RECOGNITION CONFIDENCE OF KEY PHRASE | CORRECTNESS OF RECOGNITION OF KEY PHRASE |
| WHETHER SUPPORTIVE RESPONSE OR NOT | WHETHER BEING ADDED TO DATABASE OR NOT |

FIG. 6

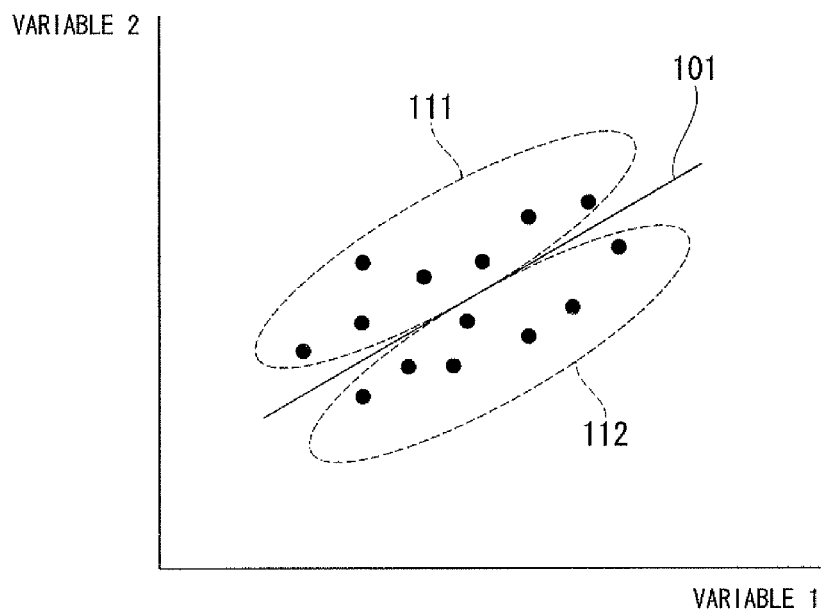

FIG. 8

| DETERMINATION | | NUMBER CLASSIFIED TO BE OUT-OF-DB UTTERANCE | NUMBER OF OUT-OF-DB UTTERANCES FROM AMONG NUMBER CLASSIFIED TO BE OUT-OF-DB UTTERANCE | NUMBER OF OUT-OF-DB UTTERANCES | PRECISION | RECALL | F VALUE |
|---|---|---|---|---|---|---|---|
| | DETERMINATION TO BE ALL OUT-OF-DB UTTERANCE (BASELINE 1) | 505 | 211 | 211 | 0.418 | 1.000 | 0.589 |
| | DETERMINATION OF iniDB (BASELINE 2) | 367 | 116 | 211 | 0.316 | 0.550 | 0.401 |
| | DETERMINATION USING DETERMINER (PROPOSED METHOD) | 230 | 154 | 211 | 0.670 | 0.730 | 0.698 |

FIG. 9

| DELETED FEATURE QUANTITY | F VALUE | DIFFERENCE |
|---|---|---|
| NONE | 0.698 | |
| MINIMUM VALUE OF SPEECH RECOGNITION CONFIDENCE OF KEY PHRASE USED FOR UTTERANCE CLASSIFICATION | 0.670 | -0.028 |
| DIFFERENCE IN ACOUSTIC MODEL OF FIRST CANDIDATE OF RECOGNITION RESULT USING LANGUAGE MODEL CREATED FROM DATABASE AND LARGE VOCABULARY LANGUAGE MODEL | 0.685 | -0.013 |
| NUMBER OF CANDIDATES OF RECOGNITION RESULT OF LANGUAGE MODEL CREATED FROM DATABASE | 0.685 | -0.013 |
| NUMBER OF WORDS OF FIRST CANDIDATE OF RECOGNITION RESULT OF LANGUAGE MODEL CREATED FROM DATABASE | 0.688 | -0.010 |
| AVERAGE VALUE OF SPEECH RECOGNITION CONFIDENCE OF KEY PHRASE OF LANGUAGE MODEL CREATED FROM DATABASE | 0.688 | -0.010 |

FIG. 10

| NUMBER OF DATA LEARNED BY CLASSIFIER | NUMBER CLASSIFIED TO BE OUT-OF-DB UTTERANCE | NUMBER OF OUT-OF-DB UTTERANCE FROM AMONG NUMBER CLASSIFIED TO BE OUT-OF-DB UTTERANCE | NUMBER OF OUT-OF-DB UTTERANCE | PRECISION | RECALL | F VALUE |
|---|---|---|---|---|---|---|
| DATA FOR ONE SPEAKER | 267 | 144 | 211 | 0.539 | 0.682 | 0.602 |
| DATA FOR TWO SPEAKERS | 265 | 158 | 211 | 0.596 | 0.749 | 0.664 |
| DATA FOR THREE SPEAKERS | 206 | 132 | 211 | 0.641 | 0.626 | 0.633 |
| DATA FOR FOUR SPEAKERS | 217 | 137 | 211 | 0.631 | 0.649 | 0.640 |
| DATA FOR FIVE SPEAKERS | 234 | 140 | 211 | 0.598 | 0.664 | 0.629 |
| DATA FOR TEN SPEAKERS | 226 | 135 | 211 | 0.597 | 0.640 | 0.618 |
| DATA FOR FIFTEEN SPEAKERS | 237 | 144 | 211 | 0.608 | 0.682 | 0.643 |
| DATA FOR TWENTY SPEAKERS | 243 | 151 | 211 | 0.621 | 0.716 | 0.665 |

QUESTION AND ANSWER DATABASE EXPANSION BASED ON SPEECH RECOGNITION USING A SPECIALIZED AND A GENERAL LANGUAGE MODEL

CROSS REFERENCE TO RELATED APPLICATIONS

This application claims benefit from U.S. Provisional application Ser. No. 61/223,817, filed Jul. 8, 2009, the contents of which are incorporated herein by reference.

BACKGROUND OF THE INVENTION

1. Field of the Invention

The present invention relates to a question and answer database expansion apparatus and a question and answer database expansion method.

2. Description of Related Art

In recent years, a system is known which automatically answers a question from a questioner. For example, in a question and answer system, shown in FIG. 12, which uses a database having pairs of question sentence examples and answer sentence examples, in order to accurately answer a question, it is necessary for a database creator to postulate all kinds of questions and to create a database which has answers to cover the questions. FIG. 12 is a diagram illustrating an example of a question and answer system having a question and answer database. When there is no answer corresponding to a question from a questioner in the database, the system having the database may repeatedly requests a question or may select an improper answer from the pairs of questions and answers and may give an improper response.

For this reason, in the system using the question and answer database, it is necessary to increase the percentage of correct responses. In order to increase the percentage of correct responses, a method is suggested in which the system using the question and answer database has a plurality of language databases, and the plurality of language databases are retrieved to select response candidates (for example, see Japanese Unexamined Patent Application Publication No. 2004-118740). In creating the database, in order to increase the percentage of correct responses, the contents of the questions are recorded, and the database creator listens to the recorded questions and finds the questions which are not registered in the question and answer database. The database creator registers the found searched unregistered questions in the question and answer database.

However, the database creator listens to all the recorded questions, Transcribes the questions, detects questions (utterances) which are not registered in the question database, and registers the detected questions in the question database, leading to a large number of steps so as to find out the unregistered questions.

SUMMARY OF THE INVENTION

The invention has been finalized in consideration of the above-described problems, and an object of the invention is to provide a question and answer database expansion apparatus and a question and answer database expansion method capable of automatically detecting questions which are not registered in a question and answer database.

In order to achieve the above-described object, a first aspect of the invention provides a question and answer database expansion apparatus. The question and answer database expansion apparatus includes a question and answer database in which questions and answers corresponding to the questions are registered in association with each other, a first speech recognition unit which carries out speech recognition for an input sound signal by using a language model based on the question and answer database, and outputs a first speech recognition result as the recognition result, a second speech recognition unit which carries out speech recognition for the input sound signal by using a language model based on a large vocabulary database, and outputs a second speech recognition result as the recognition result, and a question detection unit which detects an unregistered utterance, which is not registered in the question and answer database, from the input sound based on the first speech recognition result and the second speech recognition result, and outputs the detected unregistered utterance.

According to a second aspect of the invention, in the question and answer database expansion apparatus, the question detection unit may detect an unregistered utterance, which is not registered in the question and answer database, from the input sound in terms of sentences.

According to a third aspect of the invention, the question and answer database expansion apparatus may further include a first answer selection unit which determines whether or not a question based on the first speech recognition result and an answer corresponding to the question are registered in the question and answer database, and a second answer selection unit which determines whether or not a question based on the second speech recognition result and an answer corresponding to the question are registered in the question and answer database. The question detection unit may calculate a first feature quantity based on the first speech recognition result, may calculate a second feature quantity based on the second speech recognition result, and may detect an utterance, which is not included in the question and answer database, by using the calculated first feature quantity, the calculated second feature quantity, the determination result of the first answer selection unit, and the determination result of the second answer selection unit.

According to a fourth aspect, in the question and answer database expansion apparatus, the question detection unit may carry out learning by using the first feature quantity and the second feature quantity, may calculate a determination function for determining whether being registered in the question and answer database or not based on the learned result, and may detect an utterance, which is not included in the question and answer database, based on an evaluation value calculated by the determination function.

According to a fifth aspect of the invention, in the question and answer database expansion apparatus, the first feature quantity may be at least one of values obtained based on presence/absence of an utterance based on a supportive response obtained when the speech recognition is carried out, the length of the utterance, an acoustic score obtained when the speech recognition is carried out, a language score obtained when the speech recognition is carried out, recognition precision of the first speech recognition result, and the confidence of the first speech recognition result, and the second feature quantity may be at least one of values obtained based on presence/absence of a supportive response obtained when the speech recognition is carried out, the length of an utterance, an acoustic score obtained when the speech recognition is carried out, and a language score obtained when the speech recognition is carried out.

In order to achieve the above-described object, there is provided a question and answer database expansion method for a question and answer database expansion apparatus using a question and answer database in which questions and answers corresponding to the questions are registered in association with each other. The question and answer database expansion method includes a first speech recognition step of causing a first speech recognition unit to carry out speech recognition for an input sound signal by using a language model based on the question and answer database and to output a first speech recognition result as the recognition result, a second speech recognition step of causing a second speech recognition unit to carry out speech recognition for the input sound signal by using a language model based on a large vocabulary database and to output a second speech recognition result as the recognition result, and a question detection step of causing a question detection unit to detect an unregistered utterance, which is not registered in the question and answer database, from the input sound based on the first speech recognition result and the second speech recognition result and to output the detected unregistered utterance.

According to the first aspect of the invention, the first speech recognition result when the speech recognition is carried out for the sound signal by using the language model based on the question and answer database and the second speech recognition result when the speech recognition is carried out for the sound signal by using the language model based on the large vocabulary database are compared with each other, and the unregistered utterance, which is not registered in the question and answer database, from the input sound is detected and output. Therefore, an utterance which is not registered in the question and answer database can be automatically detected.

According to the second aspect of the invention, an utterance which is not registered in the question and answer database can be automatically detected in terms of sentences.

According to the third aspect of the invention, the utterance which is not included in the question and answer database is detected by using the determination result of whether or not the questions based on the first speech recognition result and the answers corresponding to the questions are registered in the question and answer database, the determination result of whether or not the questions based on the second speech recognition result and the answers corresponding to the questions are registered in the question and answer database, the first feature quantity based on the first speech recognition result, and the second feature quantity based on the second speech recognition result. Therefore, an utterance which is not registered in the question and answer database can be automatically detected with good precision.

According to the fourth aspect of the invention, the determination function for determining whether being registered in the question and answer database or not based on the learned result by using the first feature quantity and the second feature quantity is calculated, and the utterance which is not included in the question and answer database is detected based on the evaluation value calculated by the determination function. Therefore, an utterance which is not registered in the question and answer database can be automatically detected with good precision.

According to the fifth aspect of the invention, the utterance which is not included in the question and answer database is detected by using a plurality of feature quantities in the utterance which is not registered in the question and answer database. Therefore, an utterance which is not registered in the question and answer database can be automatically detected with good precision.

BRIEF DESCRIPTION OF THE DRAWINGS

FIG. 2 is a diagram showing an example of a question sentence, an answer sentence, and a key phrase registered in a question and answer DB 14 according to the first embodiment.

FIG. 3 is a diagram showing an example of answer selection based on an initial database and answer selection based on an expanded database to an utterance (question) from a questioner (user).

FIGS. 4A and 4B are diagrams illustrating an example of feature quantities according to the first embodiment.

FIG. 5 is a diagram illustrating the overview of feature quantities shown in FIGS. 4A and 4B according to the first embodiment.

FIG. 6 is a diagram illustrating the overview of a linear determination function for two-dimensional two normal populations.

FIG. 8 is a diagram showing evaluation values by a question and answer system to which a question and answer database expansion apparatus is applied and a question and answer system to which a question and answer database expansion apparatus is not applied.

FIG. 9 is a diagram showing an example of evaluation values when one feature quantity is deleted.

FIG. 10 is a diagram showing an example of determination precision when the amount of learned data is changed.

DETAILED DESCRIPTION OF THE INVENTION

Hereinafter, embodiments of the invention will be described in detail with reference to the drawings. It should be noted that the invention is not limited to the embodiment, and various modifications may be made without departing from the technical idea of the invention.

First Embodiment

Figure 1:
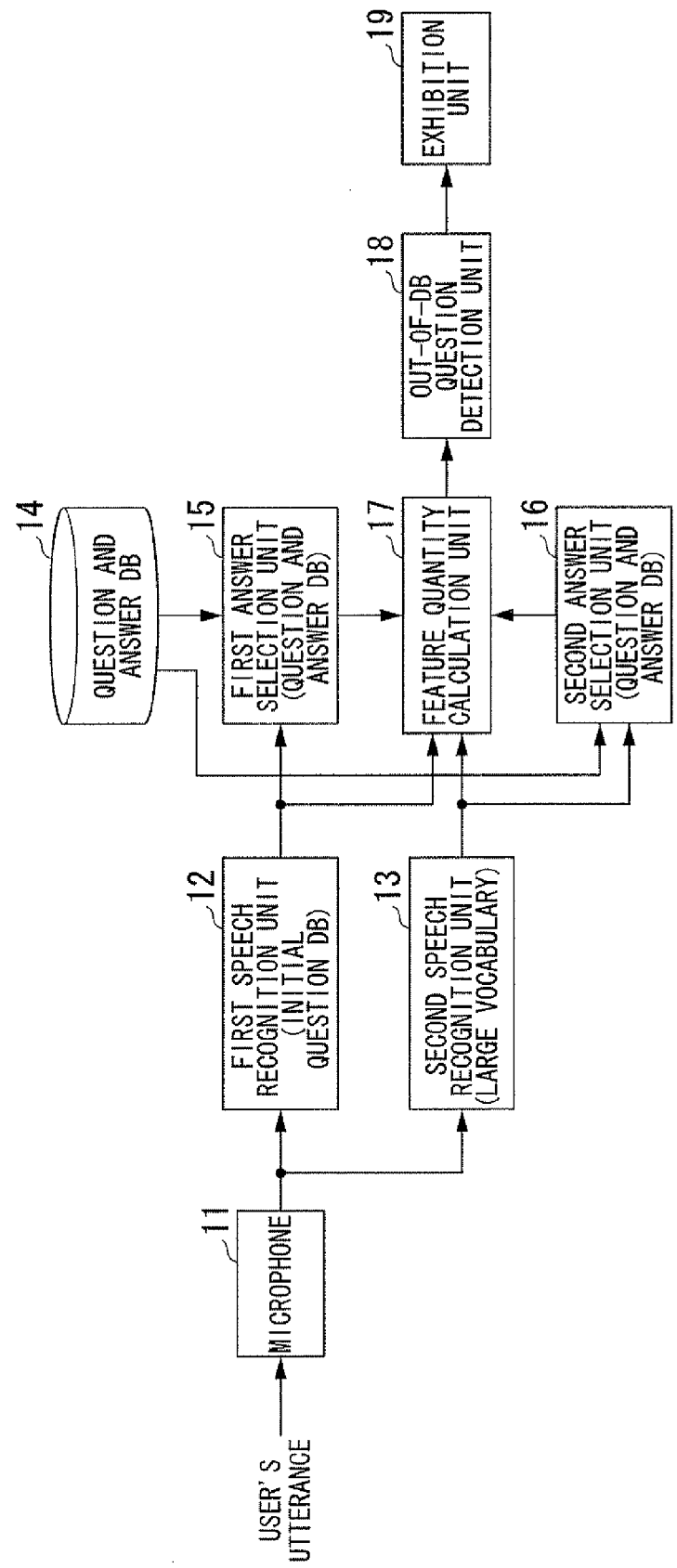
FIG. 1 is a block diagram of a question and answer database expansion apparatus according to a first embodiment.

FIG. 1 is a block diagram of a question and answer database expansion apparatus according to a first embodiment. As shown in FIG. 1, a question and answer database expansion apparatus 1 includes a microphone 11, a first speech recognition unit 12, a second speech recognition unit 13, a question and answer DB 14, a first answer selection unit 15, a second answer selection unit 16, a feature quantity calculation unit 17, an out-of-DB question detection unit 18, and an exhibition unit 19.

The microphone 11 collects an utterance of a user (hereinafter, referred to as a user's utterance), and outputs a sound signal of the collected user's utterance to the first speech recognition unit 12 and the second speech recognition unit 13.

The first speech recognition unit 12 analyzes the sound signal input from the microphone 11 by using a language model created from an initial question DB (database) to carry out recognition of the user's utterance. The language model is, for example, a stochastic model regarding which word is easily uttered. Here, the first speech recognition unit 12 uses known speech recognition based on an acoustic model by a hidden Markov model and a language model db generated from the initial question DB by a trigram (probability of three-word sequence). The first speech recognition unit 12 extracts a string of words from the input sound signal, and calculates an acoustic score and a language score. The first speech recognition unit 12 calculates the confidence of each word. As described below, the first speech recognition unit 12 generates a string of recognition results based on the input sound signal, and outputs the generated string of recognition results to the first answer selection unit 15 and the feature quantity extraction unit 16. The acoustic score represents acoustic similarity between an observed sound waveform and a word, and the language score represents the easiness of connection between words. The initial question DB is a database in which the user registers the pairs of questions and answers to be postulated (hereinafter, referred to as question-answer pairs) in advance in the question and answer database in association with each other.

The second speech recognition unit 13 analyzes the sound signal input from the microphone 11 by using a language model created from a large vocabulary DB to carry out recognition of the user's utterance. Here, the second speech recognition unit 13 uses known speech recognition based on an acoustic model by a hidden Markov model and a language model lv generated from the large vocabulary DB by a trigram (probability of three-word sequence). The second speech recognition unit 13 extracts a string of words from the input sound signal, and calculates an acoustic score and a language score. The second speech recognition unit 13 calculates the confidence of each word. As described below, the second speech recognition unit 13 generates a string of recognition results based on the input sound signal and outputs the generated string of recognition results to the feature quantity calculation unit 17 and the second answer selection unit 16.

As described above, the first speech recognition unit 12 carries out recognition of the user's utterance by using a language model generated from a probability database. Meanwhile, the second speech recognition unit 13 carries out recognition of the user's utterance by using a model generated from the large vocabulary.

The question and answer DB 14 is created in advance by the database creator, and has registered question sentences, answer sentences corresponding to the question sentences, and a key phrase in association with each other. The key phrase is a word or a plurality of words having a single meaning.

The first answer selection unit 15 receives the recognition result from the first speech recognition unit 12. The first answer selection unit 15 extracts the key phrase while combining the input recognition results. The first answer selection unit 15 determines whether a question-answer pair corresponding to the user's utterance is registered in the question and answer DB 14 or not based on the extracted key phrase. When the question-answer pair is registered in the question and answer DB 14, the first answer selection unit 15 outputs information "registered" as the determination result to the feature quantity calculation unit 17. When it is determined that the question-answer pair is not registered in the question and answer DB 14, the first answer selection unit 15 outputs information "unregistered" as the determination result to the feature quantity calculation unit 17.

The second answer selection unit 16 receives the recognition result from the second speech recognition unit 13. The second answer selection unit 16 extracts the key phrase while combining the input recognition results. The second answer selection unit 16 determines whether a question-answer pair corresponding to the user's utterance is registered in the question and answer DB 14 or not based on the extracted key phrase. When it is determined that the question-answer pair is registered in the question and answer DB 14, the second answer selection unit 16 outputs information "registered" as the determination result to the feature quantity calculation unit 17. When it is determined that the question-answer pair is not registered in the question and answer DB 14, the second answer selection unit 16 outputs information "unregistered" as the determination result to the feature quantity calculation unit 17.

The feature quantity calculation unit 17 receives the string of recognition results generated by the first speech recognition unit 12, the string of recognition results generated by the second speech recognition unit 13, and the determination result of the first answer selection unit 15, and the determination result of the second answer selection unit 16. As described below, the feature quantity calculation unit 17 calculates a feature quantity described below based on the input string of recognition results, the determination result of the first answer selection unit 15, and the determination result of the second answer selection unit 16, and outputs the calculated feature quantity to the out-of-DB question detection unit 18.

The out-of-DB question detection unit 18 (question detection unit) receives the feature quantity calculated by the feature quantity calculation unit 17. The out-of-DB question detection unit 18 carries out learning based on training data and the input feature quantity, by using weka (I. H. Witten and E. Frank. Data Mining: Practical machine learning tools and techniques, 2nd Edition. Morgan Kaufmann, San Francisco, 2005.). As a classification algorithm, NavieBayes (Yoshimi, Nankaku, Lee, and Tokuda, Selection of Automatic Answer Sentence based on Conditional Random Field in Speech Dialog System, Proceedings of 2008 Spring Meeting of Acoustical Society of Japan, 2008) is used. The out-of-DB question detection unit 18 calculates a linear evaluation function based on the learned result. The out-of-DB question detection unit 18 classifies a group in which the user's utterance is within the question and answer DB 14 and a group in which the user's utterance is out of the question and answer DB 14 based on the determined score of the calculated linear evaluation function, and determines whether the user's utterance is out of the question and answer DB 14 or out of the question and answer DB based on the classification result. When it is determined that the user's utterance is out of the question and answer DB 14, the out-of-DB question detection unit 18 outputs the determination result and the question sentence which is determined out of the question and answer DB 14 to the exhibition unit 19. When it is determined that the user's utterance is within the question and answer DB, the out-of-DB question detection unit 18 outputs the determination result to the exhibition unit 19. That is, the out-of-DB question detection unit 18 detects a question sentence out of the question and answer DB 14.

The exhibition unit 19 displays a question out of question and answer DB 14 input from the out-of-DB question detection unit 18.

FIG. 2 is a diagram showing an example of a question sentence example, an answer sentence example, and a key phrase registered in the question and answer DB 14 according to this embodiment. As shown in FIG. 2, the question and answer DB 14 describes a question and an answer by text, and registers information of a key phrase for use in matching at the time of recognition in the curly brackets { } as key phrase information. There are question sentences "Let me know a park in Sengawa" and "Is there a plaza in Sengawa?", and an answer sentence "There is the memorial park of Saneatsu Mushanokoji in Sengawa." In the question sentence "Let me know a park in Sengawa", "Sengawa" and "park" are designated as a key phrase, and in the question sentence "Is there a plaza in Sengawa?", "Sengawa" and "plaza" are designated as a key phrase.

The answer sentence "There is the memorial park of Saneatsu Mushanokoji in Sengawa" is associated with the question sentences "Let me know a park in Sengawa." and "Is there a plaza in Sengawa?", and the answer sentence and the question sentences are registered in a pair. As described above, with regard to a question-answer pair, instead of one answer sentence and one question sentence, one answer sentence and a plurality of question sentences may be registered as a question-answer pair in association with each other.

Next, the operation in the question and answer system having the question and answer database shown in FIG. 2 will be schematically described. A key phrase which is registered in the question and answer DB 14 in advance is extracted from a question of a questioner, and a question sentence which matches the extracted key phrase is retrieved. For this reason, for example, a question including a key phrase, such as "Let me know what kind of park is in Sengawa" or "Is there a massive plaza in Sengawa?", matches the question-answer pair shown in FIG. 2. When there is a pair having an answer which matches a question from a questioner, the answer to the question is output to the exhibition unit 19 or a speaker (not shown). Meanwhile, when there is no answer which matches the question, an answer which is prepared in advance and registered in the database, such as "Please repeat once more" or "It may be difficult to answer the question", is output to the exhibition unit 19 or the speaker (not shown).

As shown in FIG. 2, an answer sentence and image data (a photograph of the memorial park of Saneatsu Mushanokoji in Sengawa) corresponding to the answer sentence may be registered in association with each other. In this case, image data which is registered in association with the answer sentence may be displayed on the exhibition unit 19.

In this embodiment, a question which is not in the database is efficiently extracted, and the extracted question is presented, to the database creator. Then, the database creator registers and updates the presented out-of-database question in the database, expanding the question and answer database.

[Utterance that should be Added to Database]

FIG. 3 is a diagram showing an example of answer selection based on an initial database and answer selection based on an expanded database to an utterance (question) of a questioner (user). Used contents are town information, and 232 question-answer pairs are created in advance and registered in the question and answer DB 14 by the database creator. The number of question sentence examples is 890, and the vocabulary size of a language model is 460. Data collection is carried out such that a questioner asks a question for a character agent displayed on the exhibition unit 19, and the questioner gets out desired information. For evaluation, initial 25 utterances from among the questions of 25 speakers (users or questioners) are used, that is, data of 25 utterances×25 people=625 utterances is used.

Next, the description and definition of the terms in FIG. 3 will be made. The term "transcript" refers to a sentence which is transcribed from the user's utterance. The term "initial DB (database)" refers to a database in which questions and answers postulated in advance are registered by the database creator. The term "expanded DB" refers to a database which is expanded by additionally registering a pair of questions which is not in the database and an answer according to the question when there is no question-answer pair in the initial DB. That is, the database creator generates an answer to a question which is not the initial DB, and sequentially registers the generated answer and a question which is not in the database in pairs, expanding the database. Then, answer selection is switched based on the confirmed database, and when a question and an answer are not in the expanded database, an update is repeatedly carried out to expand the database.

"Trans+IniDB" refers to the result of answer selection based on the initial DB (IniDB) using the utterance (Trans) transcribed from the user's utterance. "Trans+ExpDB" refers to the result of answer selection based on the expanded DB (ExpDB) using the utterance (Trans) transcribed from the user's utterance. "ASR+IniDB" refers to the result of answer selection based on the initial DB (IniDB) using the utterance (ASR) obtained from the user's utterance by speech recognition.

In FIG. 3, a column 111 refers to a case where "the result of answer selection based on the initial DB using the utterance transcribed from the user's utterance" and the result of answer selection based on the expanded DB using the utterance transcribed from the user's utterance" coincide with each other, and "the results of answer selection based on the initial DB using the utterance from the user's utterance by speech recognition" all coincide with each other. The symbol 111 indicates that the number of such utterances is 246.

A column 114 refers to a case where "the result of answer selection based on the initial DB using the utterance transcribed from the user's utterance" and "the result of answer selection based on the expanded DB using the utterance transcribed from the user's utterance" coincide with each other, and the utterance using speech recognition is erroneously recognized. The column 114 indicates that the number of such utterances is 15.

A column 115 refers to a case where "the result of answer selection based on the initial DB using the utterance transcribed from the user's utterance" and "the result of answer selection based on the expanded DB using the utterance transcribed from the user's utterance" coincide with each other, and as "the result of answer selection based on the initial DB using the utterance obtained from the user's utterance by speech recognition", a question-answer pair is not in the initial DB. The column 115 indicates that the number of such utterances is 31.

The case where "the result of answer selection based on the initial DB using the utterance transcribed from the user's utterance" and "the result of answer selection based on the expanded DB using the utterance transcribed from the user's utterance" coincide with each other refers to a case where an answer is provided from the question and answer system, and the answer conforms to the intention of the user's utterance. That is, this indicates that the number of utterances having proper answers are 292 (the total number of utterances in the columns 111 to 115).

A column 122 refers to a case where "the result of answer selection based on the initial DB using the utterance transcribed from the user's utterance" and "the result of answer selection based on the expanded DB using the utterance transcribed from the user's utterance" do not coincide with each other, and "the result of answer selection based on the initial DB using the utterance obtained from the user's utterance by speech recognition" and "the result of answer selection based on the initial DB using the utterance transcribed from the user's utterance" coincide with each other. The column 122 indicates that the number of such utterances is 44.

A column 123 refers to a case where "the result of answer selection based on the initial DB using the utterance transcribed from the user's utterance" and "the result of answer selection based on the expanded DB using the utterance transcribed from the user's utterance" do not coincide with each other, and "the result of answer selection based on the initial DB using the utterance obtained from the user's utterance by speech recognition" and "the result of answer selection based on the expanded DB using the utterance transcribed from the user's utterance" coincide with each other. The column 123 indicates that the number of such utterances is 2.

A column 124 refers to a case where "the result of answer selection based on the initial DB using the utterance transcribed from the user's utterance" and "the result of answer selection based on the expanded DB using the utterance transcribed from the user's utterance" do not coincide with each other, and the utterance is erroneously recognized as "the result of answer selection based on the initial DB using the utterance obtained from the user's utterance by speech recognition". The column 124 indicates that the number of such utterances is 26.

A column 125 refers to a case where "the result of answer selection based on the initial DB using the utterance transcribed from the user's utterance" and "the result of answer selection based on the expanded DB using the utterance transcribed from the user's utterance" do not coincide with each other, and as "the result of answer selection based on the initial DB using the utterance obtained from the user's utterance by speech recognition", a question-answer pair is not in the initial DB. The column 125 indicates that the number of such utterances is 4.

The case where "the result of answer selection based on the initial DB using the utterance transcribed from the user's utterance" and "the result of answer selection based on the expanded DB using the utterance transcribed from the user's utterance" do not coincide with each other refers to a case where, an answer is provided from the question and answer system, but the answer does not conform to the intention of the user's utterance. That is, this indicates that the number of utterances having no proper answer is 76 (the total number of utterances in the columns 122 to 125).

A column 133 refers to a case where, as "the result of answer selection based on the initial DB using the utterance transcribed from the user's utterance", a question-answer pair is not in the initial DB, and "the result of answer selection based on the initial DB using the utterance obtained from the user's utterance by speech recognition" and "the result of answer selection based on the expanded DB using the utterance transcribed from the user's utterance" coincide with each other. The column 133 indicates that the number of such utterances is 6.

A column 134 refers to a case where, as "the result of answer selection based on the initial DB using the utterance transcribed from the user's utterance", a question-answer pair is not in the initial DB, and the utterance is erroneously recognized as "the result of answer selection based on the initial DB using the utterance obtained from the user's utterance by speech recognition". The column 134 indicates that the number of such utterances is 38.

A column 135 refers to a case where, as "the result of answer selection based on the initial DB using the utterance transcribed from the user's utterance", a question-answer pair is not in the initial DB, and as "the result of answer selection based on the initial DB using the utterance obtained from the user's utterance by speech recognition", a question-answer pair is not in the initial DB. The column 135 indicates that the number of such utterances is 91.

When a question-answer pair is not in the initial DB as "the result of answer selection based on the initial DB using the utterance transcribed from the user's utterance", the total number of utterances is 135 (the total number of utterances in the columns 133 to 135).

When an answer is not obtained even when the expanded DB is used, the number of utterances including noise and an erroneous section is 122 (the total number of utterances in the columns 143 to 145).

In (T1), "Trans+IniDB" and "Trans+ExpDB" coincide with each other. In (T2), an answer is provided from the question and answer system, but the answer does not conform to the intention of the user's utterance. In (T3), no question-answer pair is found when answer selection is carried out from the database based on the utterance transcribed from the user's utterance by the database creator. In (T4), no answer is obtained from the question and answer system at the time of answer selection even when the expanded database is used, or the utterance includes noise or an erroneous section.

Next, in order to expand the question and answer DB 14, in FIG. 3, an utterance which should be input to the database is examined.

When the recognition result of "Trans+IniDB" and the recognition result of "Trans+ExpDB" are different from each other, but an understanding result coincide with a correct answer, since there is a question-answer pair with respect to the question in the database, an answer is provided. The understanding result is the result when the question and answer system having the question and answer DB 14 used for examination selects an answer to a question. When a key phrase just coincide with a question but is not appropriately registered, an answer that the user desired to listen to as the user intended may not be obtained. That is, "Trans+IMDB" and "Trans+ExpDB" do not coincide with each other, such that an answer is not as the user intended, thus it is necessary to correct the designation method of the key phrase, or the user requests the detailed contents.

As the recognition result of "Trans+IniDB", when it is determined that an utterance which is recognized to be out of the database coincides with a question within the database as the answer selection result, this indicates that, even if the user's utterance is out of the database, a similar utterance is within the database. That is, this indicates that, with regard to an utterance out of the database, as the result of speech recognition, a word within the database may be erroneously recognized.

That is, when the intention of the user's utterance and the understanding of the system are different from each other, or when the user's utterance is not in the database, the utterance should be added to the contents of the database.

As described above, examples of an utterance which should be added to the database include utterances in the column 123 which are out of the database and are erroneously classified to be within the database, and utterances in the columns 133 to 135 which are actually out of the database.

[Description of Speech Recognition]

Next, speech recognition which is carried out by the first speech recognition unit 12 and the second speech recognition unit 13 will be described. The first speech recognition unit 12 uses known speech recognition based on an acoustic model by a hidden Markov model and a language model db generated from the initial question DB by a trigram (probability of three-word sequence). The first speech recognition unit 12 extracts a string of words from an input sound signal, and calculates an acoustic score and a language score. The first speech recognition unit 12 also calculates the confidence of each word. The first speech recognition unit 12 generates a string of recognition results of the following expression (1) with respect to the input sound signal and a predetermined integer n (the maximum number of results), and outputs the generated string of recognition results to the first answer selection unit 15 and the feature quantity extraction unit 16. Let the length of sound in the input sound signal be d.

Expression 1

$$R_{lm,1}, R_{lm,2}, \ldots, R_{lm,m_{lm,i}} \quad (m_{lm,i} \leq n) \tag{1}$$

In the expression (1), lm represents a language model, and $R_{lm,i}$ is constituted by a string of words $s_{lm,i}$, an acoustic score amscore$_{lm,i}$, and a language score lmscore$_{lm,i}$. The string of words $s_{lm,i}$ is a string of sets of words $w_{lm,i}$ and the confidence $cm_{lm,i}$ of the words as expressed by the following expression (2).

Expression 2

$$(w_{lm,i,1}, cm_{lm,i,1}), (w_{lm,i,2}, cm_{lm,i,2}), \ldots, \\ (w_{lm,i,1l_{lm,i}}, cm_{lm,i,l_{lm,i}}) \tag{2}$$

Let the length of sound in the input sound signal be d. Hereinafter, description will be provided for a case where the question of the user's utterance is "Let me know a bookstore in Sengawa".

In this case, the first speech recognition unit 12 outputs the recognition results $R_{db,i}$ of the following expressions (3) to (7) as the recognition result to the first answer selection unit 15 and the feature quantity calculation unit 17.

Expression 3

$$S_{db,1} = (w_{db,1,j}, cm_{db,1,j})_{j=1}^{J=5} = (\text{Sengawa}, 0.57), (ni, 0.36), (\text{honya}, 0.45), (wa, 0.34), (\text{arimasuka}, 0.64) \tag{3}$$

A meaningful Japanese sentence is constructed.
Is there a bookstore in Sengawa?

Expression 4

$$S_{db,2} = (w_{db,2,j}, cm_{db,2,j})_{j=1}^{J=5} = (\text{Sengawa}, 0.53), (ni, 0.45), (\text{honya}, 0.59), (wa, 0.32), (\text{arimasuka}, 0.67) \tag{4}$$

A meaningful Japanese sentence is constructed.
Is there a bookstore in Sengawa?

Expression 5

$$S_{db,3} = (w_{db,3,j}, cm_{db,3,j})_{j=1}^{J=5} = (\text{Sengawa}, 0.53), (\text{nihon}, 0.22), (ya, 0.35), (wa, 0.44), (\text{arimasuka}, 0.34) \tag{5}$$

A meaningful Japanese sentence is not constructed.
Sengawa, Japan, arrow, wa, Is there?

Expression 6

$$S_{db,4} = (w_{db,4,j}, cm_{db,4,j})_{j=1}^{J=5} = (\text{Engawa}, 0.46), (ni, 0.31), (\text{honya}, 0.45), (wa, 0.32), (\text{arimasuka}, 0.61) \tag{6}$$

A meaningful Japanese sentence is not constructed.
Is there a bookstore in a veranda?

Expression 7

$$S_{db,5} = (w_{db,5,j}, cm_{db,5,j})_{j=1}^{J=5} = (\text{Sengawa}, 0.48), (\text{nihon}, 0.21), (ya, 0.35), (wa, 0.47), (\text{arimasuka}, 0.55) \tag{7}$$

A meaningful Japanese sentence is not constructed.
Sengawa, two pieces, arrow, wa, Is there?

In the expressions (3) to (7), (Sengawa, 0.57) indicates a combination of a word and the confidence of the word. The confidence of a word is calculated by using Julius (http://julius.sourceforge.jp/) which is a speech recognition engine. The confidence of a word is a criterion representing how much the word as the speech recognition result is reliable. The confidence of a word has a numerical value of 0 to 1.0. As the numerical value is close to 1.0, this indicates that there is scarcely another competitive candidate having a score similar to the word. As the numerical value is close to 0, this indicates that there are a lot of other word candidates having a score similar to the word. The expressions (3) to (7) outputs a string of words by a combination of a word and the confidence of the word with respect to each of a lot of combinations, which are an example of the recognition result, to the first answer selection unit 15 and the feature quantity calculation unit 17 as the recognition result. Although an example has been described where the confidence of a word is calculated by Julius, the confidence of a word may be calculated by using another known method which calculates a word included in sound from the sound signal and the confidence of the word.

Similarly, the second speech recognition unit 13 uses known speech recognition using an acoustic model by a hidden Markov model and a language model lv generated from the large vocabulary DB belonging to Julius by a trigram (probability of three-word sequence). The second speech recognition unit 13 generates a string of recognition results of the expression (1) with respect to the input sound signal and a predetermined integer n (the maximum number of results), and outputs the generated string of recognition results to the second answer selection unit 16 and the feature quantity calculation unit 17. The reason why the language model generated from the large vocabulary DB is as follows. The recognition result of speech recognition using the language model generated from the large vocabulary DB may show erroneous recognition, but, in many cases, the phoneme is correctly recognized. For this reason, the use of the result of speech recognition using the language model generated from the large vocabulary DB enables the estimation of the certainty of the result of speech recognition using the language model generated from the question and answer DB 14.

The first answer selection unit 15 receives the recognition result $R_{db,i}$ from the first speech recognition unit 12. The first answer selection unit 15 extracts a key phrase from the combination of the input recognition results, and determines whether each string of words $S_{sb}$ is registered in the question and answer DB 14 or not based on the extracted key phrase. As a result, the first answer selection unit 15 determines that an answer which is paired with the question corresponding to the string of words expressed by the expressions (3) to (7) is registered in a pair in the question and answer DB 14 and outputs, to the feature quantity calculation unit 17, the indication that there is an answer as the answer result. In the following example, for simplification of description, it is assumed that a key phrase is a single word. Let the respective key phrases be $K_1, K_2, \ldots, K_p$.

The second answer selection unit 16 receives the recognition result $R_{lv,i}$ from the second speech recognition unit 13. The second answer selection unit 16 extracts a key phrase from the combination of the input recognition results, and determines whether each string of words Ssb is registered in the question and answer DB 14 or not based on the extracted key phrase. When it is determined that a question sentence corresponding to the string of words is registered in the question and answer DB, the second answer selection unit 16 determines that an answer which is paired with the question sentence corresponding to the string of words is registered in the question and answer DB 14. When an answer to a question is registered, the second answer selection unit 16 outputs, to the feature quantity calculation unit 17, the indication that there is an answer as the answer result.

[Description of Calculation of Feature Quantity]

Next, a calculation method of a feature quantity by the feature quantity calculation unit 17 will be described. The feature quantity calculation unit 17 receives the string of recognition results of the expression (1) generated by the first speech recognition unit 12 and the string of recognition results generated by the second speech recognition unit 13, the determination result of the first answer selection unit 15, and the determination result of the second answer selection unit 16.

FIGS. 4A and 4B are diagrams illustrating an example of feature quantities according to this embodiment. In FIG. 4A, $F_{db}1$ to $F_{db}18$ are feature quantities which are extracted from the recognition results based on the initial question and answer. DB by the first speech recognition unit 12. In FIG. 4B, $F_{lv}1$ to $F_{lv}9$ are feature quantities which are extracted from the recognition results based on the large vocabulary DB by the second speech recognition unit 13. $F_{dblv}1$ and $F_{dblv}2$ are a difference between the recognition result by the first speech recognition unit 12 and the recognition result by the second speech recognition unit 13. In FIGS. 4A and 4B, the term "system" refers to a question and answer system to which the question and answer database expansion apparatus of this embodiment is applied.

$F_{db}1$ represents whether or not the system determines to be out of the question and answer DB 14 (presence/absence of selected answer). $F_{db}2$ represents the acoustic score of a first candidate of the recognition result÷the utterance length. The utterance length is the length of one sentence, and the number of elements of one sentence (the number of segments or the number of morphemes). $F_{db}3$ represents the language score of the first candidate of the recognition result. $F_{db}4$ represents the sum of (the number of appearances of a key phrase used for answer selection in an n-th candidate of the recognition result÷the number of words of the n-th candidate)÷the number of candidates of the recognition result. $F_{db}5$ represents the minimum value of (the number of appearances of a key phrase i used for answer selection in all of the recognition results). $F_{db}6$ represents the maximum value of (the number of appearances of a key phrase i used for answer selection in all of the recognition results). $F_{db}7$ represents (the number of key phrases within the question and answer DB 14 included in the first candidate of the recognition result)−(the number of key phrases used for answer selection). $F_{db}8$ represents the minimum value of (the number of appearances of a key phrase i used for answer selection in the n-th candidate of the recognition result÷the number of words in the n-th candidate). $F_{db}9$ represents the maximum value of (the number of appearances of the key phrase i used for answer selection in the n-th candidate of the recognition result÷the number of words in the n-th candidate). $F_{db}10$ represents whether or not the recognition result is included in the supportive response list. $F_{db}11$ represents the number of words in the first candidate of the recognition result. $F_{db}12$ represents the number of words in all of the recognition results. $F_{db}13$ represents the average value of (the Julius confidence (recognition confidence) of the first candidate of a key phrase used for answer selection). $F_{db}14$ represents the maximum value of (the Julius confidence of the first candidate of the key phrase i used for answer selection). $F_{db}15$ represents the minimum value of (the Julius confidence of the first candidate of the key phrase i used for answer selection). $F_{db}16$ represents the number of candidates of the recognition result. $F_{db}17$ represents the number of nouns included in the first candidate of the recognition result÷the number of words in the first candidate of the recognition result. $F_{db}18$ represents the number of nouns included in all of the candidates of the recognition result÷the number of words of all of the candidates of the recognition result.

$F_{lv}1$ represents whether or not the system determines to be out of the question and answer DB (presence/absence of selected answer). $F_{lv}2$ represents the acoustic score of the first candidate of the recognition÷the utterance length. $F_{lv}3$ represents the language score of the first candidate of the recognition result. $F_{lv}4$ represents whether or not the recognition result is included in the supportive response list. $F_{lv}5$ represents the number of vocabularies of the first candidate of the recognition result. $F_{lv}6$ represents the number of vocabularies in all of the recognition results. $F_{lv}7$ represents the number of candidates of the recognition result. $F_{lv}8$ represents the number of nouns which appear in the first candidate of the recognition result÷the number of words of the first candidate of the recognition result. $F_{lv}9$ represents the number of nouns which appear in all of the candidates of the recognition result÷the number of words of all of the candidates of the recognition result.

$F_{dblv}1$ represents the difference between the acoustic score calculated by the first speech recognition unit 12 and the acoustic score calculated by the second speech recognition unit 13. $F_{dblv}2$ represents the difference between the language score calculated by the first speech recognition unit 12 and the language score calculated by the second speech recognition unit 13.

The term "supportive response list" refers to a list of supportive responses or utterances which are expected by the user as a response with respect to the question and answer system. The supportive response list is created manually by the database creator or automatically generated by the question and answer system. $F_{db}10$ represents that, when an input utterance coincides with the supportive response list, the utterance is out of the question and answer DB 14. The comparison of the number of nouns in the utterance or the appearance frequency enables determination of the amount of topic or the like. For example, when there are a large number of nouns from among the words in the utterance, this indicates that an utterance includes a plurality of topics.

Next, an example of the calculation method of the feature quantity by the feature quantity calculation unit 17 will be described.

$F_{db}1$ represents the determination result of the first answer selection unit 15, and the determination result (presence/absence of selected answer) of whether or not the system determines to be out of the question and answer DB 14. That is, $F_{db}1$ represents the determination result of the first answer selection unit 15 of whether or not an answer corresponding to a question sentence is registered in the question and answer DB 14. When an answer corresponding to a question sentence is registered in the question and answer DB 14, the feature quantity calculation unit 17 sets that the first answer selection unit 15 selects an answer within the question and answer DB 14 (presence). When an answer corresponding to a question sentence is not registered in the question and answer DB 14, the feature quantity calculation unit 17 sets that the first answer selection unit 15 does not select an answer within the question and answer DB 14 (absence), that is, an answer is out of the question and answer DB 14. When an answer is not in the question and answer DB 14, it is highly likely that the first speech recognition unit 12 carries out erroneous recognition, or the user's utterance is out of the question and answer DB 14.

The feature quantity calculation unit 17 calculates $F_{db}2$ by (the acoustic score of the first candidate of the recognition result)÷(the utterance length). That is, the feature quantity calculation unit 17 calculates $F_{db}2$ by using the acoustic score amscore included in the string of recognition results and the length d of sound, that is, by $(amscore_{db,1}) \div d$. $amscore_{db}$ represents the acoustic score by the language model db created from the initial question database. That is, $F_{db}2$ indicates the precision of the recognition result.

$F_{db}3$ represents the language score of the first candidate of the recognition result, and indicates the precision of the recognition result. That is, $F_{db}3$ represents the language score lmscore$_{db}$ included in the string of recognition results.

$F_{db}5$ represents the minimum value min$_i$ of the number of appearances of the key phrase i used for answer selection in all of the recognition results. Here, if the key phrase is expressed by the curly brackets, from the question sentence "Let me know a bookstore in Sengawa", {Sengawa} and {bookstore} are key phrases, $K_1$={Sengawa}, and $K_2$={bookstore}. For this reason, there are four combinations (i,j) in which, with regard to a word appearing in the following expression (8) regarding each string of words, the relationship $w_{db,i,j}=K_k$ is established, that is, (i,j)=(1,1), (2,1), (3,1), and (5,1), with respect to $K_1$=Sengawa.

Similarly, there are three combinations in which, with regard to a word appearing in the following expression (8) regarding each string of words, the relationship $w_{db,i,j}=K_k$ is established, that is, (i,j)=(1,3), (2,3), and (4,3), with respect to $K_2$=bookstore. That is, if $K_1$ is greater than $K_2$, this means that the number of combinations (i,j) with $w_{db,i,j}=K_1$ is greater than the number of combinations (i,j) with $w_{db,i,j}=K_2$. For this reason, the feature quantity calculation unit 17 calculates, as $F_{db}5$, the number of combinations (i,j), in which the relationship $w_{db,i,j}=K_2$ is established, that is 3 which is the minimum value min$_i$.

Expression 8

$$S_{db,i_{i=1}}^{i=5} \qquad (8)$$

$F_{db}6$ represents the maximum value max$_i$ of the number of appearances of the key phrase i used for answer selection by the first answer selection unit 15 in all of the recognition results. For this reason, the feature quantity calculation unit 17 calculates, as $F_{db}6$=4, the number of combinations (i,j) with $w_{db,i,j}=K_1$, that is, 4 which is the maximum value max$_i$. As described above, $F_{db}4$ to $F_{db}9$ represents the recognition precision with regard to the key phrase used for answer selection.

$F_{db}14$ represents the maximum value max$_i$ of the recognition confidence of the key phrase with coincidence when answer selection is performed by the first answer selection unit 15, and is calculated by the feature quantity calculation unit 17. For this reason, in the expressions (3) to (7), for all k, j which satisfies the relationship $w_{db,i,j}=K_k$ with regard to a word of the first candidate of the recognition result is j=1, and 3 with $w_{db,i,1}=K_1$ (Sengawa) and $w_{db,i,3}=K_2$ (bookstore). Next, for all j thus selected, in comparison of the confidence cm$_{sb,1,j}$, cm$_{sb,1,1}$=0.57 and cm$_{sb,1,3}$=0.45, thus cm$_{sb,1,1}$ is greater than cm$_{sb,1,3}$. Thus, the feature quantity calculation unit 17 calculates, as $F_{db}14$, cm$_{sb,1,1}$=0.57 which is the maximum value max$_i$.

$F_{db}15$ represents the minimum value min$_n$ of the recognition confidence of the key phrase with coincidence when answer selection is performed by the first answer selection unit 15. Thus, the feature quantity calculation unit 17 calculates, as $F_{db}15$, cm$_{sb,1,3}$=0.45 which is the minimum value min$_n$.

$F_{lv}1$ represents the determination result (presence/absence of selected answer) of whether or not the system determines to be out of the question and answer DB 14. That is, $F_{lv}1$ represents the determination result of the second answer selection unit 16 of whether or not an answer corresponding to a question sentence is registered in the question and answer DB 14. When an answer corresponding to a question sentence is registered in the question and answer DB 14, the feature quantity calculation unit 17 sets that an answer is within the question and answer DB 14 (presence). When an answer corresponding to a question sentence is not registered in the question and answer DB 14, the feature quantity calculation unit 17 sets that an answer is not within the question and answer DB 14 (absence), that is, an answer is out of the question and answer DB 14.

$F_{lv}2$ represents (the acoustic score of the first candidate of the recognition result)÷(the utterance length) and is calculated by the feature quantity calculation unit 17. That is, the feature quantity calculation unit 17 calculates $F_{lv}2$ by using the acoustic score amscore included in the string of recognition results and the length d of sound, that is, by (amscore$_{lv,1}$)÷d. amscore$_{lv}$ represents the acoustic score by the language model lv created from the large vocabulary database.

$F_{lv}3$ represents the language score of the first candidate of the recognition result. That is, $F_{lv}3$ represents the language score lmscore$_{lv}$ included in the string of recognition results.

FIG. 5 is a diagram illustrating the overview of the feature quantities shown in FIGS. 4A and 4B according to this embodiment. As shown in FIG. 5, "appearance frequency of key phrase" ($F_{db}5$ and $F_{db}6$) represents the correctness of recognition of the key phrase. "Presence/absence of a name tag other than the key phrase used for answer selection" ($F_{db}17$ and $F_{db}18$) represents the possibility of erroneous answer selection. "Recognition precision of key phrase" ($F_{db}4$ to $F_{db}9$) represents the correctness (precision) of recognition of the key phrase. "Whether supportive response is or not" "($F_{db}10$) represents information for determination whether being added to the question and answer DB 14 or not. For example, when "supportive response" is included in the user's utterance, this means that a proper answer is provided to a question of the user.

The feature quantity calculation unit 17 outputs the feature quantities calculated in the above-described manner to the out-of-DB question detection unit 18.

Next, an out-of-DB question detection method which is carried out by the out-of-DB question detection unit 18 will be described. The out-of-DB question detection unit 18 receives the feature quantities calculated by the feature quantity calculation unit 17.

The out-of-DB question detection unit 18 first makes training data learn by using weka, and makes the input feature quantities learn by using weka. As an algorithm for classification, NavieBayes is used. Other methods may be used for a tool for use in learning, and other methods may be used for the algorithm for classification.

As described with reference to FIG. 3, the question detection of the question and answer DB 14 which is carried out by the out-of-DB question detection unit 18 is to detect an utterance which should be added to the question and answer DB 14. That is, an utterance which is out of the question and answer DB 14 is erroneously recognized to be within the question and answer DB 14, or an utterance which is actually out of the question and answer DB 14 is detected.

The out-of-DB question detection unit 18 carries out learning by using the feature quantity extracted from the utterance in such a manner, and automatically generates a determination function to determine whether a question is an out-of-DB question or not. The out-of-DB question detection unit 18 detects whether a question is an out-of-DB question or not based on the evaluation scores of the generated determination function, and outputs a question, which is determined to be an out-of-DB question, to the exhibition unit 19.

Next, an example of the determination method of whether or not a question is an out-of-DB question which is carried out by the out-of-DB question detection unit 18 will be described. For the feature quantities ($F_{db}1$ to $F_{db}18$, $F_{lv}1$ to $F_{lv}9$, $F_{dblv}1$, and $F_{dblv}2$) for each learned utterance, the out-of-DB question detection unit 18 calculates a linear determination function of the following expression (9). A known method is used in the calculation of the linear determination function. First, a learning process using the utterance of training data is performed.

Expression 9

$$w1 \times F_{db}1 + w2 \times F_{db}2 + \ldots + w29 \times F_{db}2 \qquad (9)$$

In the expression (9), w1 to w29 are the weight coefficients of the respective feature quantities. The weight coefficients are set, for example, such that an utterance of training data which is known in advance to be within the DB can be discriminated from an utterance of training data which is known in advance to be out of the DB. The value calculated by the expression (9) is a determination score (the value of linear combination). Next, the out-of-DB question detection unit 18 classifies a group in which the user's utterance is within the DB and a group in which the user's utterance is out of the DB based on the calculated determination score, and determines whether the user's utterance is within the DB or out of the DB based on the classification result.

FIG. 6 is a diagram illustrating the overview of a linear determination function for two-dimensional two normal populations. FIG. 6 shows an example where a normal population 111 and a normal population 112 are classified by a linear determination function 101. For example, the normal population 111 corresponds to an utterance out of the DB, and the normal population 112 corresponds to an utterance within the DB. Although an example has been described where a linear determination function is used as the determination function, other determination functions may be used. The learning method or the determination method is not limited to that described above, and other known methods may be used.

The exhibition unit 19 displays an input question, which is determined to be a question out of the DB, on a display unit of the exhibition unit, and presents the question to the creator of the question and answer DB. The creator of the question and answer DB registers the question, which is presented to the exhibition unit 19 and is determined to be a question out of the DB, in the question and answer DB in association with an answer corresponding to the question, expanding the question and answer DB.

For example, it is assume that "Let me know a bookstore in Sengawa" is already registered in the question and answer DB 14, and {Sengawa} and {bookstore} are registered as a key phrase. Next, when an utterance "Where is a bookstore in Sengawa?" is input, {Sengawa}, {bookstore}, and {where} are extracted as a key phrase of the utterance. Of the three key phrases extracted from the utterance, two key phrases {Sengawa} and {bookstore} are already registered in the question and answer DB 14, thus the database creator registers the question sentence "Where is a bookstore in Sengawa?", the key phrase {where}, and an answer to the question in the question and answer DB 14. The information which is presented to the exhibition unit 19 may be presented for each questioner, or may be collectively presented for a plural number of questioners. When it is determined that there are a plurality of question sentences which are not registered in the question and answer DB, the information may be presented in sequence for the questioners, or may be displayed in accordance with the priority calculated by the exhibition unit 19 based on the ratio of coincidence of a key phrase registered in the question and answer DB and a key phrase included in a question.

As described above, speech recognition is carried out for the user's utterance by the language model generated from the initial question DB, and speech recognition is carried out for the user's utterance by the language model generated from the known large vocabulary DB. The respective feature quantities are calculated from the recognition result of speech recognition, and an utterance, which should be added to the question and answer DB, is extracted from the user's utterance based on the calculated feature quantities. Therefore, an utterance out of the database can be appropriately and automatically detected. Then, the database creator registers the detected utterance in the database, expanding the database.

As a result, the database creator can expand the database without transcribing all of the user's utterances, instead of expanding the database while listening to all of the user's utterances.

Second Embodiment

Figure 7:
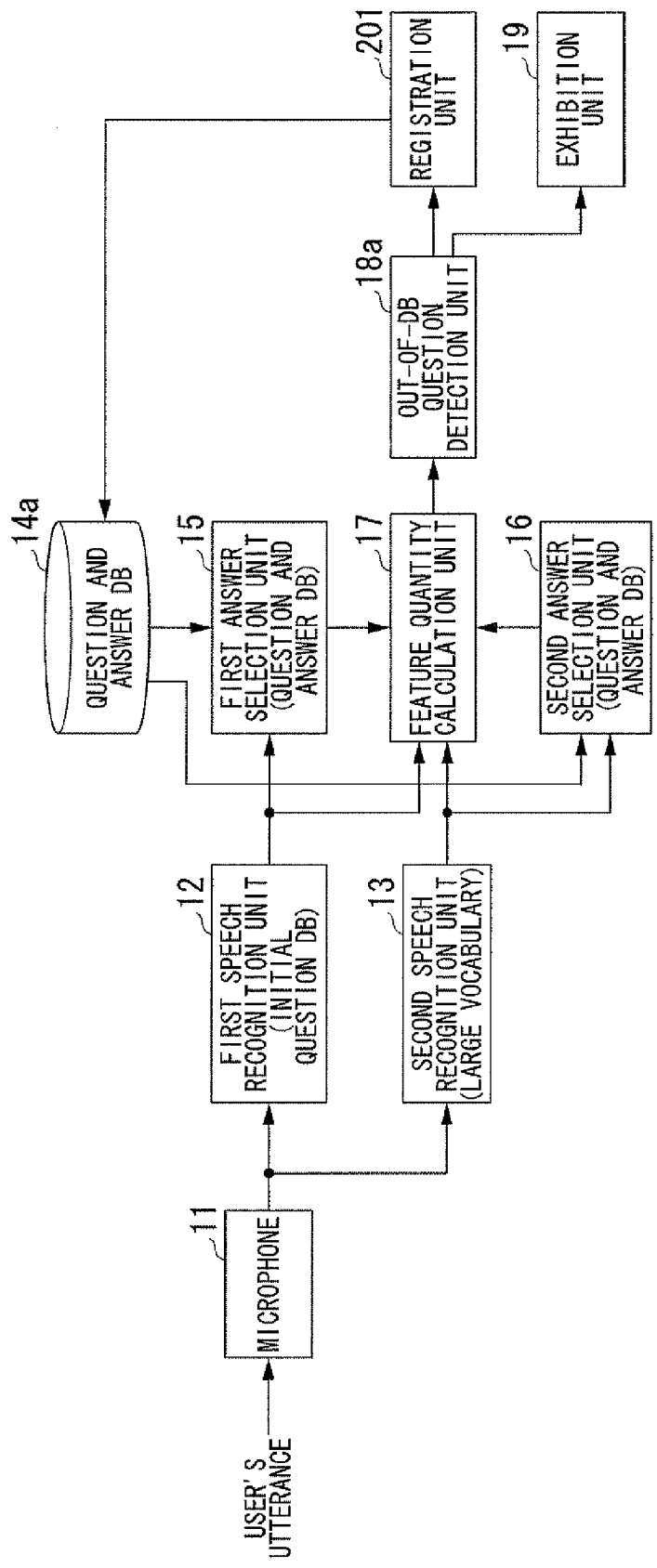
FIG. 7 is a block diagram of a question and answer database expansion apparatus according to a second embodiment.

In the first embodiment, the detected utterance which should be added to the question and answer DB is presented to the exhibition unit 19, and the creator of the question and answer DB registers the presented utterance. The question and answer database expansion apparatus may automatically register the detected utterance. FIG. 7 is a block diagram of a question and answer database expansion apparatus of this embodiment. The same functional units as in the first embodiment are represented by the same reference numerals, and descriptions thereof will be omitted. Differences from the configuration of the first embodiment are a question and answer DB 14a, an out-of-DB question detection unit 18a, and a registration unit 201.

The out-of-DB question detection unit 18a receives the feature quantities calculated by the feature quantity calculation unit 17. The out-of-DB question detection unit 18a makes the input feature quantities learn by using weka to generate a classification unit. For the algorithm for classification, NavieBayes is used. The classification unit of the out-of-DB question detection unit 18a calculates a linear evaluation function based on the learned result. A determination unit of the out-of-DB question detection unit 18a classifies a group in which the user's utterance is within the question and answer DB 14a and a group in which the user's utterance is out of the question and answer DB 14a based on the determination score of the calculated linear evaluation function, and determines whether the user's utterance is within the question and answer DB 14a or out of the question and answer DB 14a based on the classification result. When it is determined to be out of the question and answer DB 14a, the out-of-DB question detection unit 18a outputs the determination result and a question sentence which is determined to be out of the question and answer DB 14a to the exhibition unit 19. When it is determine to be within the question and answer DB 14a, the out-of-DB question detection unit 18a outputs the determination result to the exhibition unit 19 and the registration unit 201.

When it is determined to be out of the question and answer DB 14a, the registration unit 201 receives the determination result and a question sentence which is determined to be out of the question and answer DB 14a. When it is determined to be within the question and answer DB 14a, the registration unit 201 receives the determination result. The registration unit 201 determines whether the input determination result is to be out of the question and answer DB 14a or not, and when the determination result is to be out of the question and answer DB 14a, registers a question sentence, which is determined to be out of the question and answer DB 14a, in the question and answer DB 14a. The registration unit 201 extracts key phrases from the question sentence, which is determined to be out of the question and answer DB 14a, in accordance with a predetermined rule, and retrieves the question and answer DB 14*a* for a key phrase, which is not registered in the question and answer DB 14*a*, from among the extracted key phrases. When there is an unregistered key phrase, the registration unit 201 registers the unregistered key phrase in the question and answer DB 14*a*.

As described above, a question sentence in the user's utterance which is not registered in the question and answer DB is detected, and the detected question sentence and the key phrases included in the question sentence are automatically registered in the question and answer DB, expanding the database.

As a result, the database creator can expand the database without transcribing all of the user's utterances, instead of expanding the database while listening to all of the user's utterances.

Although in this embodiment, an example has been described where 29 types of feature quantities are used, the number of feature quantities is not limited thereto. The type of feature quantities are not limited to those described above, and other types of feature quantities may be used.

Although In this embodiment, an example has been described where the question and answer database expansion apparatus is applied to the question and answer system, for example, the question and answer database expansion apparatus may be applied to a reception system or a humanized robot which answers the user's utterance.

Although in this embodiment, an example has been described where the database is provided in the question and answer database expansion apparatus, the database may be connected in a wired or wireless manner.

Although in this embodiment, an example has been described where a large vocabulary DB belonging to Julius is used for the large vocabulary DB, for example, another general large vocabulary DB having about a ten thousand vocabularies may be used. Although an example has been described where Julius is used for speech recognition, another general speech recognition method may be used.

A program for realizing the functions of the respective units in the embodiment of FIG. 1 or FIG. 7 may be recorded in a computer-readable recording medium, and the program recorded in the recording medium is read by and run on a computer system to carry out the processing of the respective units. The term "computer system" used herein refers to a concept including an OS and hardware, such as peripheral devices.

When the WWW system is used, the term "computer system" refers to a concept including a homepage provision environment (or display environment).

The term "computer-readable recording medium" refers to a storage device, such as a portable medium (a flexible disk, a magnetooptical disk, a ROM (Read Only Memory), or a CD-ROM), an USB memory which is connected to the computer system through a USB (Universal Serial Bus) I/F (interface), or a hard disk incorporated into the computer system. The term "computer-readable recording medium" refers to a concept including a communication link when a program is transmitted through a network, such as Internet, or a communication network, such as a telephone network, which dynamically stores the program for a short time, or a volatile memory in a server or the computer system serving as a client, which stores a program for a predetermined time. The program may realize some of the above-described functions, or may realize the above-described functions in combination with a program which is already recorded in the computer system.

[Experiment Result]

Next, the result of an experiment using a question and answer system to which the question and answer database expansion apparatus of this embodiment is applied will be described.

In the experiment, from among 625 utterances (25 utterances from 25 people) which were examined for expansion of the question and answer database, 505 utterances, excluding noise (T4) having no corresponding answer in the transcribed utterance classification, were used. The classification unit was generated by making the extracted feature quantities learn with weka which is a data mining tool. As the algorithm for classification, NavieBayes was used.

Next, the evaluation values Precision, Recall, and F value used for evaluation of the experiment result will be described. The respective evaluation values are calculated by the following expressions (10) to (12).

Expression 10

$$\text{Precision} = \frac{\text{the number of out-of-database utterances from among the utterances to be classified to be out-of-database utterance}}{\text{the number of utterances classified to be out-of-database utterance}} \quad (10)$$

Expression 11

$$\text{Recall} = \frac{\text{the number of out-of-database utterances from among the utterances classified to be out-of-database utterance}}{\text{the number of out-of-database utterances}} \quad (11)$$

Expression 12

$$F \text{ Value} = 2/((1/\text{Precision}) + (1/\text{Recall})) \quad (12)$$

FIG. 8 is a diagram showing evaluation values by a question and answer system to which a question and answer database expansion apparatus is applied and a question and answer system to which a question and answer database expansion apparatus is not applied. An experiment was carried out by a baseline 1, a baseline 2, and the method of the embodiment (proposed method).

With regard to "Determination to be all out of the database" of the base line 1, all of the utterances are out of the database, and a question and answer system is used to which the question and answer database expansion apparatus is not applied. With regard to "IniDB" of the baseline 2, all of the utterances are determined based on the initial database, and a question and answer system is used to which the question and answer database expansion apparatus is not applied. With regard to the method (proposed method) of the embodiment, learning was made by using NavieBayes, and learning and evaluation were made by using 10-fold cross validation.

As shown in FIG. 8, the result by the method of the baseline 1 exhibits that the F value increases, but since it is impossible to actually carry out detection, the result is not good. The result by the method of the baseline 2 shows that the result $LM_{db}$ is obtained only by using information regarding whether or not the result of answer selection using IniDB (initial database) is out of the database. From this result, however, it can be seen that the classification precision is not high. From the evaluation result of the method (proposed method) of the embodiment, higher determination precision than the baseline was obtained.

[Examination of Effective Feature Quantity]

Next, the result of examination of a feature quantity which is most effective for determination precision improvement will be described. With regard to the examination, a procedure for deleting one feature quantity and calculating an evaluation value was carried out for each feature quantity, such that which feature quantity most contributed to the determination precision improvement was examined. Five upper feature quantities after it was detected the question sentence was out of the question and answer DB, and the F value when the feature quantities were deleted were as shown in FIG. 9. FIG. 9 is a diagram showing an example of an evaluation value when one feature quantity is deleted.

As shown in FIG. 9, the effective feature quantity was $F_{db}15$ which is the minimum value of the speech recognition confidence of the key phrase used for utterance classification, and the F value when the feature quantity $F_{db}15$ was deleted was 0.685. The effective feature quantity was the difference $F_{dblv}1$ in the acoustic model of the first candidate between $LM_{db}$ and $LM_{lv}$, and the F value when the feature quantity $F_{dblv}1$ was deleted was 0.685. The effective feature quantity was $F_{db}16$ which is the number of candidates of the recognition result of $LM_{db}$, and the F value when the feature quantity $F_{db}16$ was deleted was 0.685. The effective feature quantity is $F_{db}11$ which is the number of words of the recognition result of $LM_{db}$, and the F value when the feature quantity $F_{db}11$ was deleted was 0.688. The effective feature quantity was $F_{db}13$ which is the average value of the Julius confidence of the key phrase of $LM_{db}$, and the F value when the feature quantity $F_{db}13$ was deleted was 0.688.

$F_{db}15$ and $F_{db}13$ indicate how much the speech recognition result of the key phrase is correct. $F_{db}11$ represents the precision of recognition, and $F_{db}16$ indicates the possibility of a question regarding a plurality of topics if the number of words is large. The difference $F_{dblv}1$ indicates how much the recognition results of $LM_{db}$ and $LM_{lv}$ are deviated from an actual sound utterance. As described above, it was confirmed that the feature quantities were effective for estimation of whether or not a key phrase is correctly recognized.

[Examination of Precision of Data Amount]

Figure 11:
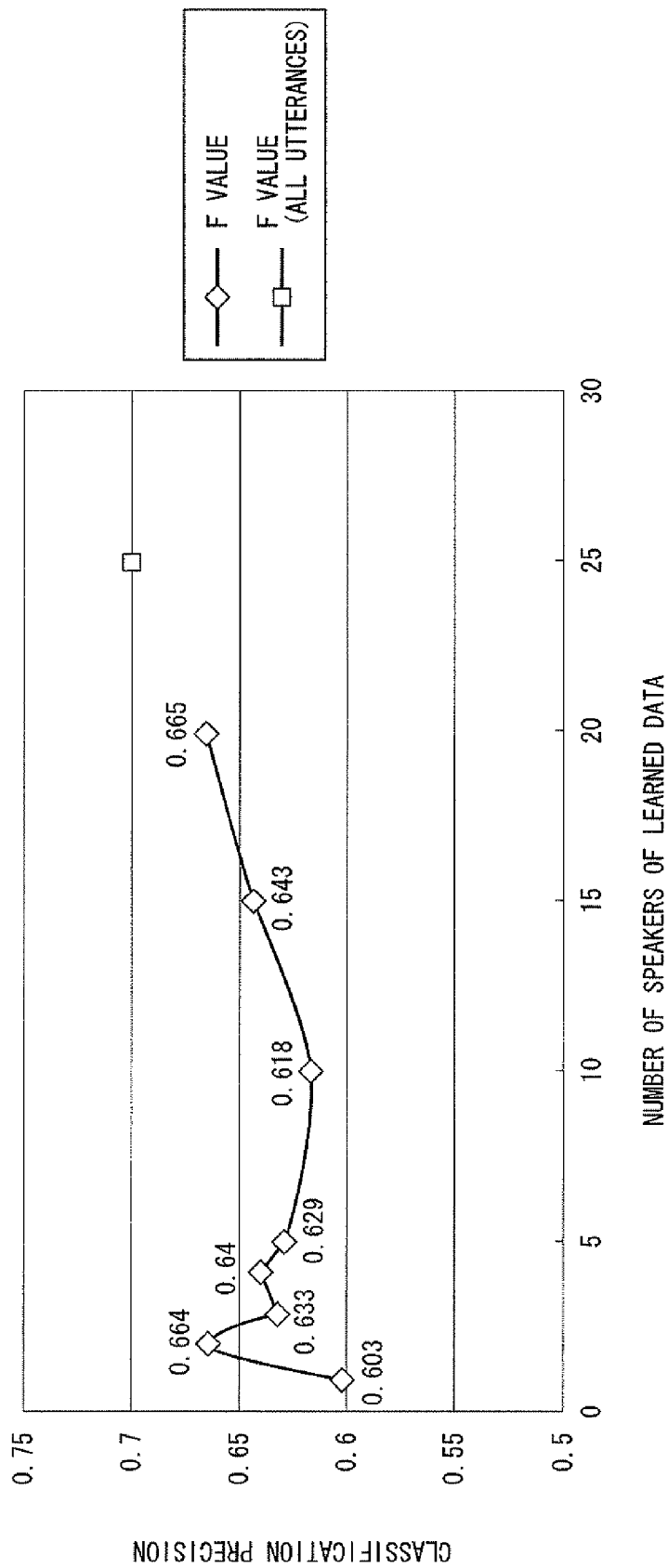
FIG. 11 is a diagram graphically showing the result of FIG. 10.
Figure 12:
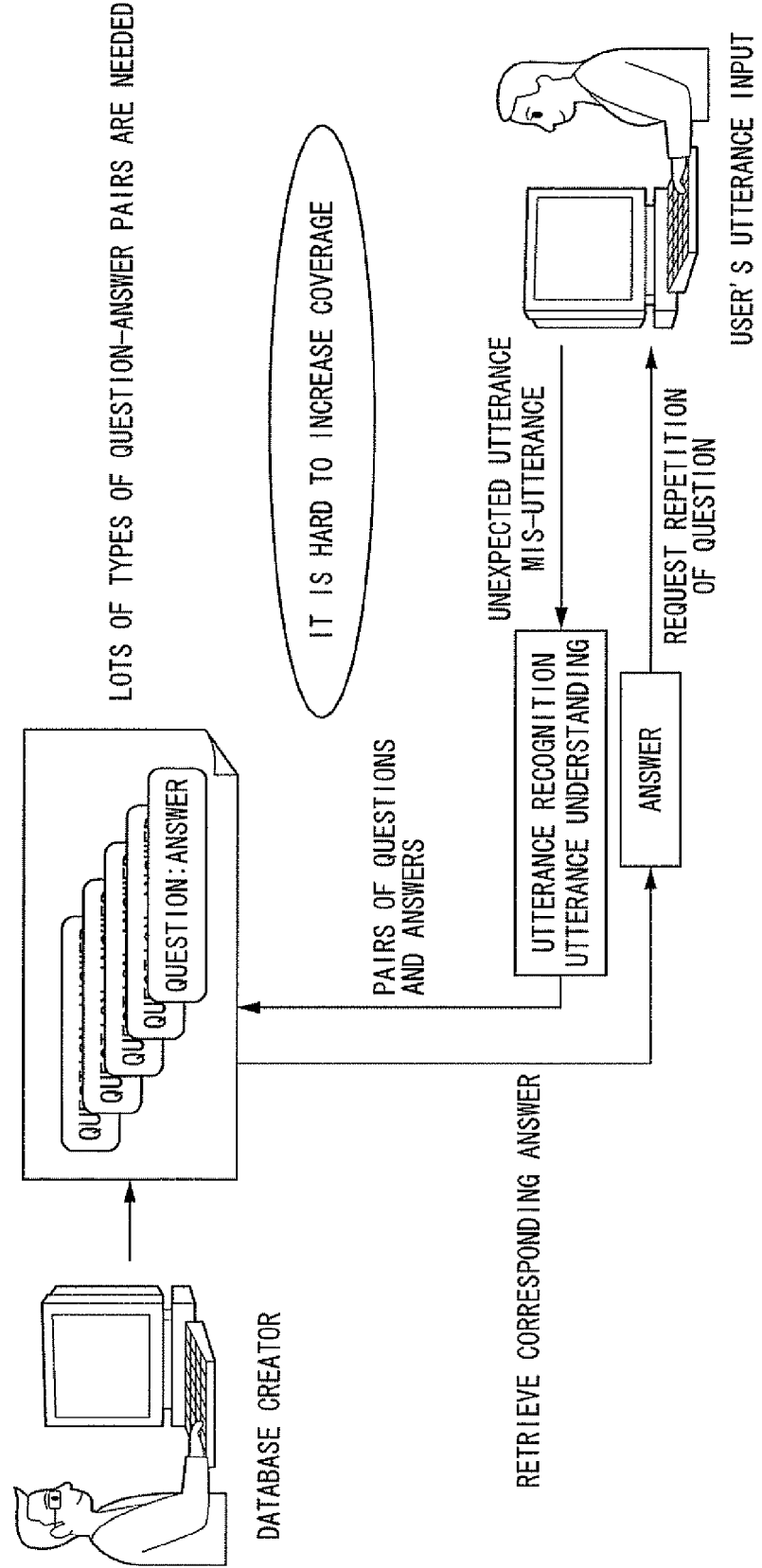
FIG. 12 is a diagram illustrating an example of a question and answer system having a question and answer database according to the related art.

With regard to the learning of the determination unit of the out-of-DB question detection unit 18, if a large amount of data is needed, transcription or the like is needed in constructing learned data, making it difficult to reduce labor of the database creator in expanding the database. For this reason, the determination precision when the number of training data of the determination unit of the out-of-DB question detection unit 18 was confirmed. FIG. 10 shows an example of determination precision when the amount of learned data is changed. FIG. 11 is a diagram graphically showing the result of FIG. 10. As shown in FIG. 10, the F value (0.602 to 0.665) when the number of learned data is reduced is low compared to the F value 0.698 in the case of 10-fold cross validation used by the experiment result shown in FIG. 8. However, this value is higher than the F value 0.401 by the method of the baseline. For this reason, the method of this embodiment is effective for a case where the number of learned data is reduced.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A question and answer database expansion apparatus comprising:
    a question and answer database in which questions and answers corresponding to the questions are registered in association with each other;
    a first speech recognition unit which carries out speech recognition for an input sound signal by using a language model based on the question and answer database, and outputs a first speech recognition result as the recognition result;
    a second speech recognition unit which carries out speech recognition for the input sound signal by using a language model based on a large vocabulary database, and outputs a second speech recognition result as the recognition result; and a first answer selection unit which determines whether or not a question based on the first speech recognition result and an answer corresponding to the question are registered in the question and answer database;
    a second answer selection unit which determines whether or not a question based on the second speech recognition result and an answer corresponding to the question are registered in the question and answer database,
    wherein the question detection unit calculates a first feature quantity based on the first speech recognition result, calculates a second feature quantity based on the second speech recognition result, and detects an utterance, which is not included in the question and answer database, by using the calculated first feature quantity, the calculated second feature quantity, the determination result of the first answer selection unit, and the determination result of the second answer selection unit; and
    a question detection unit which detects an unregistered utterance, which is not registered in the question and answer database, from the input sound based on the first speech recognition result and the second speech recognition result, and outputs the detected unregistered utterance.

2. The question and answer database expansion apparatus according to claim 1,
    wherein the question detection unit detects an unregistered utterance, which is not registered in the question and answer database, from the input sound in terms of sentences.

3. The question and answer database expansion apparatus according to claim 1,
    wherein the question detection unit carries out learning by using the first feature quantity and the second feature quantity, calculates a determination function for determining whether being registered in the question and answer database or not based on the learned result, and detects an utterance, which is not included in the question and answer database, based on an evaluation value calculated by the determination function.

4. The question and answer database expansion apparatus according to claim 1,
    wherein the first feature quantity is at least one of values obtained based on presence/absence of an utterance based on a supportive response obtained when the speech recognition is carried out, the length of the utterance, an acoustic score obtained when the speech recognition is carried out, a language score obtained when the speech recognition is carried out, recognition precision of the first speech recognition result, and confidence of the first speech recognition result, and the second feature quantity is at least one of values obtained based on presence/absence of a supportive response obtained when the speech recognition is carried out, the length of an utterance, an acoustic score obtained when the speech recognition is carried out, and a language score obtained when the speech recognition is carried out.

5. A question and answer database expansion method for a question and answer database expansion apparatus using a question and answer database, in which questions and answers corresponding to the questions are registered in association with each other, the question and answer database expansion method comprising:

a first speech recognition step of causing a first speech recognition unit to carry out speech recognition for an input sound signal by using a language model based on the question and answer database and to output a first speech recognition result as the recognition result;

a second speech recognition step of causing a second speech recognition unit to carry out speech recognition for the input sound signal by using a language model based on a large vocabulary database and to output a second speech recognition result as the recognition result a first answer selection step which determines whether or not a question based on the first speech recognition result and an answer corresponding to the question are registered in the question and answer database; and a second answer selection step which determines whether or not a question based on the second speech recognition result and an answer corresponding to the question are registered in the question and answer database, wherein the question detection step calculates a first feature quantity based on the first speech recognition result, calculates a second feature quantity based on the second speech recognition result, and detects an utterance, which is not included in the question and answer database, by using the calculated first feature quantity, the calculated second feature quantity, the determination result of the first answer selection unit, and the determination result of the second answer selection unit; and a question detection step of causing a question detection unit to detect an unregistered utterance, which is not registered in the question and answer database, from the input sound based on the first speech recognition result and the second speech recognition result and to output the detected unregistered utterance.

\* \* \* \* \*